United States Patent
Herzog

(10) Patent No.: US 10,435,070 B2
(45) Date of Patent: Oct. 8, 2019

(54) VEHICLE-TRAILER BACKING SYSTEM HAVING TARGETLESS HITCH ANGLE DETECTION AND TRAILER GEOMETRY LEARNING

(71) Applicant: Continental Automotive Systems, Inc., Auburn Hills, MI (US)

(72) Inventor: Brandon Herzog, Waterford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/032,629

(22) Filed: Jul. 11, 2018

(65) Prior Publication Data

US 2018/0319438 A1 Nov. 8, 2018

Related U.S. Application Data

(63) Continuation of application No. PCT/US2017/013351, filed on Jan. 13, 2017.

(60) Provisional application No. 62/278,723, filed on Jan. 14, 2016.

(51) Int. Cl.
| | |
|---|---|
| *B62D 13/06* | (2006.01) |
| *G06N 20/00* | (2019.01) |
| *B60D 1/06* | (2006.01) |
| *B60D 1/24* | (2006.01) |
| *B60R 11/04* | (2006.01) |
| *B60W 30/18* | (2012.01) |

(52) U.S. Cl.
CPC ............... *B62D 13/06* (2013.01); *B60D 1/06* (2013.01); *B60D 1/245* (2013.01); *B60R 11/04* (2013.01); *B60W 30/18036* (2013.01); *G06N 20/00* (2019.01); *B60W 2300/14* (2013.01); *B60W 2420/42* (2013.01); *B60W 2520/22* (2013.01)

(58) Field of Classification Search
None
See application file for complete search history.

(56) References Cited

U.S. PATENT DOCUMENTS

| | | | |
|---|---|---|---|
| 2014/0085472 A1 | 3/2014 | Lu et al. | |
| 2014/0188344 A1 | 7/2014 | Lavoie | |
| 2016/0039456 A1* | 2/2016 | Lavoie | ................. B62D 15/027 701/41 |
| 2016/0280258 A1* | 9/2016 | Lavoie | ..................... B62D 6/10 |

(Continued)

FOREIGN PATENT DOCUMENTS

| | | |
|---|---|---|
| DE | 102004050149 A1 | 4/2006 |
| WO | WO20120103193 A1 | 8/2012 |

OTHER PUBLICATIONS

International Search Report and the Written Opinion of the International Searching Authority dated Apr. 18, 2017 for corresponding PCT application No. PCT/US2017/013351.

*Primary Examiner* — Richard M Camby

(57) ABSTRACT

A backing system for a trailer and vehicle and associated method includes recording an image of a hitch for the vehicle and trailer assembly with a camera. A plurality of distances related to geometry of the vehicle and the trailer and a plurality of reference points are learned based on the camera inputs. A plurality of reference distances related to the plurality of reference points are then determined. A current hitch angle may then be determined using the plurality of reference distances and the geometry distances.

16 Claims, 2 Drawing Sheets

(56) References Cited

U.S. PATENT DOCUMENTS

2017/0106865 A1\* 4/2017 Lavoie ................. B62D 15/027
2017/0129403 A1\* 5/2017 Lavoie ...................... B60R 1/00

\* cited by examiner

VEHICLE-TRAILER BACKING SYSTEM HAVING TARGETLESS HITCH ANGLE DETECTION AND TRAILER GEOMETRY LEARNING

CROSS-REFERENCE TO RELATED APPLICATIONS

This application is the National Stage of International Application No. PCT/US2017/013351, filed on Jan. 13, 2017, which claims the benefit of U.S. provisional application No. 62/278,723, filed on Jan. 14, 2016, each of which is hereby incorporated by reference.

TECHNICAL FIELD

The present disclosure relates to automotive vehicles and more particularly to advance driver assistance systems for automotive vehicles.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

In one exemplary embodiment, a method of controlling a backing system for a vehicle and trailer assembly includes recording an image of a hitch for the vehicle and trailer assembly with a camera coupled to the vehicle. The method also includes learning with the electronic control unit a plurality of distances related to geometry of the vehicle and the trailer and identifying a plurality of reference points on the trailer. The method further includes learning with the electronic control unit a plurality of reference distances related to the plurality of reference points. The method also includes determining a current hitch angle using the plurality of reference distances and the geometry distances.

In one exemplary embodiment, a backing system for a vehicle and trailer assembly includes a control device and an electronic control unit. The electronic control unit is in communication with the control device to receive at least one input from the control device. The electronic control unit includes instructions for initiating a backing system mode with an electronic control unit for a backing system when a start system input is received from a control device and recording an image of a hitch for the vehicle and trailer assembly with a camera mounted to the vehicle. The electronic control unit also includes instructions for learning with the electronic control unit a plurality of geometry distances related to geometry of the vehicle and the trailer and identifying a plurality of reference points on the trailer. The electronic control unit further includes instructions for learning with the electronic control unit a plurality of reference distances related to the plurality of reference points and determining a current hitch angle using the plurality of reference distances and the geometry distances.

BRIEF DESCRIPTION OF THE DRAWINGS

The present disclosure will become more fully understood from the detailed description and the accompanying drawings, wherein.

DETAILED DESCRIPTION

Figure 1:
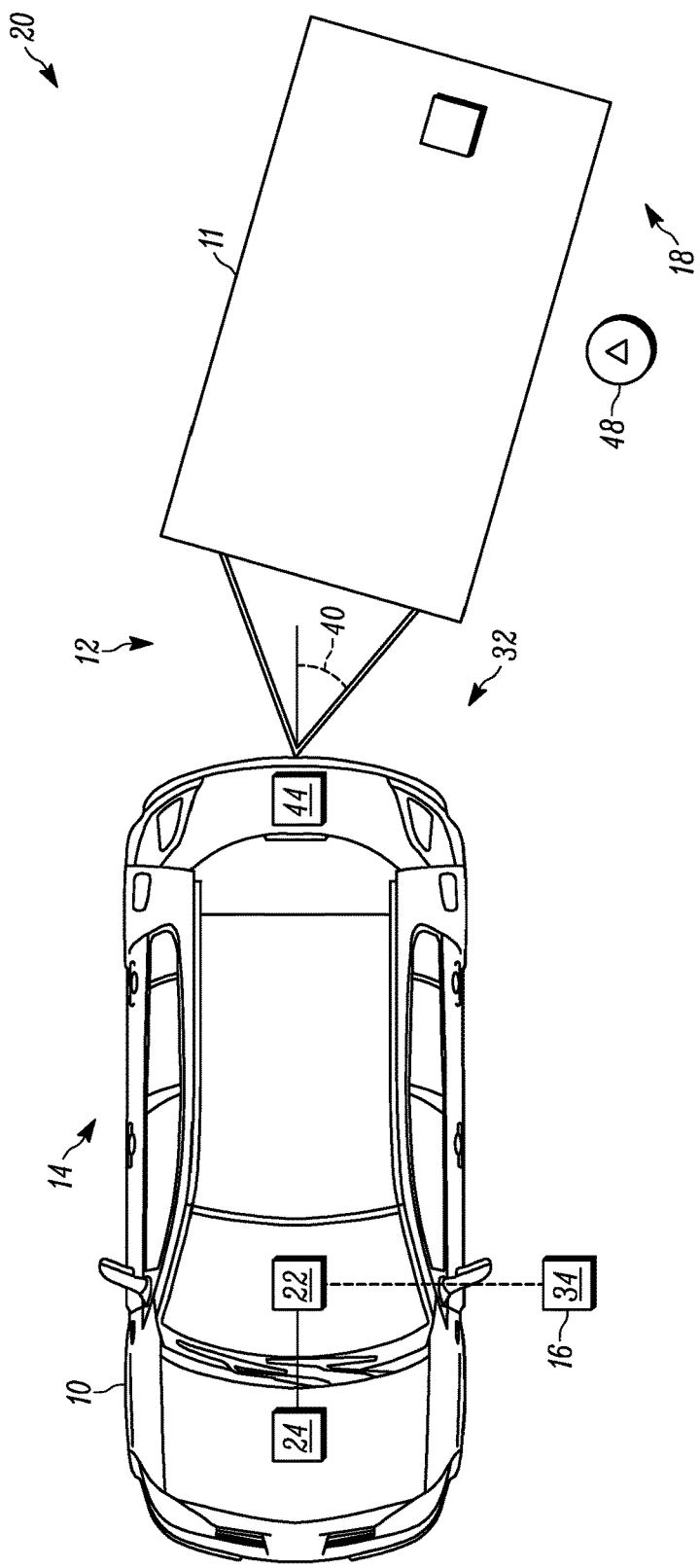
FIG. 1 is a schematic diagram of a vehicle and trailer assembly having a trailer backing system.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The vehicle 10 may be a car, truck, tractor, etc. The trailer 11 is controllably secured to the vehicle 10 to form a vehicle and trailer assembly 12. The vehicle and trailer assembly 12 utilizes a trailer backing system 14 as described herein. Throughout the description, the relative directions of forward and rear are used in the traditional manner. That is, in reference to the direction which an operator for the vehicle 10 would typically be facing when driving the vehicle 10. Therefore, in operation of the trailer backing program 14 the vehicle 10 would be in a reverse gear and the vehicle and trailer assembly 12 are moving backward, illustrated by arrow 13 in FIG. 2. During use of the backing system 14, the operator of the system 14 may also be facing or walking "backward" in the same direction the vehicle-trailer unit 12 is moving.

Figure 2:
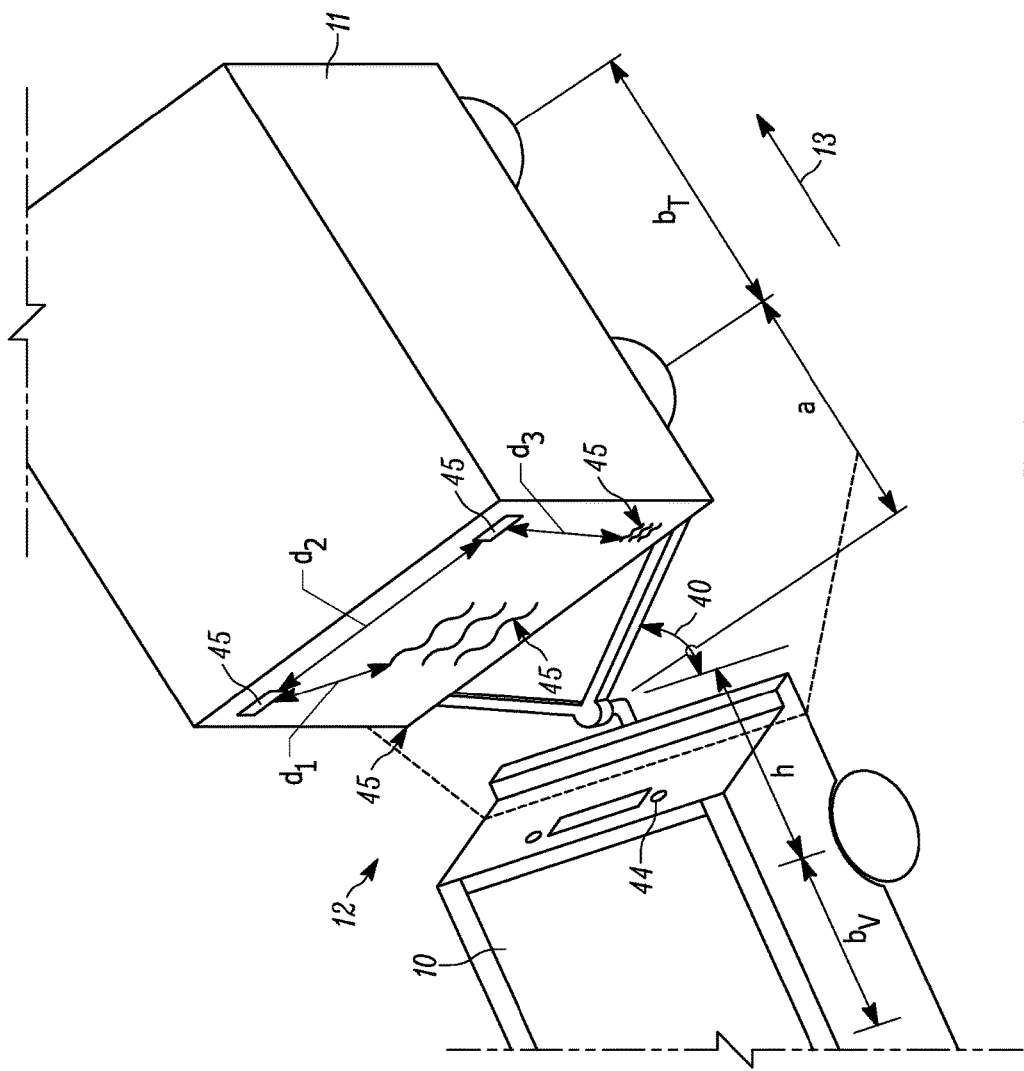
FIG. 2 is a first embodiment for the trailer backing system of FIG. 1, wherein a camera view of the hitch and trailer is illustrated.

Referring to FIGS. 1 and 2, an exemplary embodiment for utilizing the trailer backing system 14 is described. A control device 16 is in communication with an electronic control unit ("ECU") 22 to allow a user to input instructions to the ECU 22. The control device 16 acts as a human machine interface ("HMI") between the operator and the backing system 14. The ECU 22 may be in communication with various vehicle systems 24 such as a powertrain system, a steering system, a brake system, etc., to control and direct movement of the vehicle and trailer assembly 12. The ECU 22 sends instructions to the vehicle systems 24 to move the vehicle and trailer assembly 12 along a desired backing path 18 to a final location 20 based upon user inputs.

The control device 16 may be incorporated into the vehicle 10, or as described herein, may be a seperate device in communciation with the vehicle 10, e.g., via wireless communication techniques. The control device 16 may be a tablet or other mobile device that can be operated from outside the vehicle 10. Therefore, the trailer backing system 14 gives a user control of the vehicle 10 while outside the vehicle 10. For example, the user can shift gears of the vehicle 10, e.g., from park to reverse and back again. The wireless control device 16 allows the user to maneuver the vehicle 10, and thus, the trailer 11. The control device 16 may have various input options to control the vehicle 10 including buttons and/or virtual display of HMI inputs for: the gear selector (to enable wireless shifting between gears), a gas pedal, a brake pedal, a digital speedometer, a surround view and an emergency stop button. An emergency stop button may be implemented as a safety measure and will bring the vehicle 10 to an immediate stop and shift the vehicle 10 into a "Park" state when wireless control is active.

The ECU 22 receives a variety of inputs from the control device 16 to control the vehicle and trailer assembly 12 with the backing system 22. The ECU 22 interprets the various inputs, and determines the desired vehicle action that the input 26 is requesting. Based upon a current status of the vehicle and trailer assembly 12, and the desired vehicle action, the ECU 22 determines a required vehicle response needed to achieve the desired vehicle action, and sends the appropriate signal(s) to instruct the various vehicle systems 24 to perform the calculated vehicle response. The backing system 14 can incorporate the variety of input requests to provide complete user control of the vehicle and trailer assembly 12 from outside the vehicle 10. In particular, the backing system 14 uses a hitch angle 40 between the vehicle 10 and the trailer 11 to determine the correction vehicle-trailer position and to determine the vehicle response needed to achieve the desired vehicle action, i.e., the change in hitch angle that is needed.

The backing system 14 may use one or more cameras 44 on the vehicle 10 to provide a rear view of the vehicle 10, wherein the camera 44 viewing angle shown in phantom in FIG. 2. In one exemplary embodiment, the camera 44 may also be utilized in the vehicle 10 as a back-up camera or a surround view camera. The camera 44 captures an image and image analysis by the ECU 22 is used to calculate the measured hitch angle 40. The measured hitch angle 40 is used by the ECU 22 to determine a desired steering angle based on the requested hitch angle. The current hitch angle 40 may also be displayed on the device 16 as well for user information.

Referring to FIGS. 1 and 2, determining the hitch angle 40 is explained in further detail. The ECU 22 determines current hitch angle 40 using image analyses the trailer backing system 14 can use reference points 45 on the trailer 11, such as the corners of the trailer, hitch attachment point, body decals that are provided by the manufacturer, etc. The reference points 45 may be vertically and/or horizontally spaced from one another. In the exemplary embodiment, at least three reference points 45 are used. The ECU 22 may employ a learning mode to learn the relative distances ($d_1$, $d_2$, $d_3$, etc.) of the reference points 45 at known hitch angles 40 the first time the system 14 is used. Thus, the trailer backing system 14 could learn the relative distances ($d_1$-$d_n$) between the markings 45 when the trailer 11 is hitched to the vehicle 10 and at a known angle, e.g., a zero degree hitch angle.

In addition to learning the relative distances ($d_1$-$d_n$) of the reference points 45 the backing system 14 may also utilize trailer geometry in the learning mode. By utilziing the relative distances ($d_1$-$d_n$) of the reference points 45 and the trailer geometry, the ECU 22 may calculate the articulation angle (hitch angle 40) between the vehicle/tractor 10 and trailer 11 and track in changes in the hitch angle 40 in real time. The ECU 22 may utilize the vehicle 10 and trailer 11 geometry including the vehicle wheelbase ($b_V$), the distance from the rear axle to the hitch point on the vehicle h, the length of the trailer (c), hitch point to first axle on trailer (a), the height from the ground to the hitch point (g), and some of the geometry of the front of the trailer, i.e., the reference points 45.

Further extension is possible to self-learn the trailer 11 geometry and length based on prior movements of the trailer 11 in forward (or possible backwards 13) motion. Each trailer 11 has certain characteristics of control largely depending on the length of the trailer 11. Monitoring the movement of the trailer 11 while the vehicle-trailer system 12 is in motion makes it possible to self-learn the trailer 11 geometry and begin tracking the trailer angle 40 in real time It is feasible to enable the use of a surround view to have additional cameras 44 that provide a better view of the vehicle-trailer unit 12 and more accurately determine the geometry of the trailer 11. The view of multiple cameras 44 at once may also be utilized to determine the trailer geometries and trailer hitch angle 40. It is also possible to cross-check estimated trailer 11 angles and geometry on all attached cameras that has the tractor trailer 11 in the view of the system 14. For example, left and right cameras 44 mounted on vehicle 10 side mirrors, or proximate to those locations may also be able to track the trailer angle 40 and self-learn the trailer geometry.

It is important to note that self-learning may require input of the vehicle dynamics and video(s) feed. Determining the length the trailer 11 may be assisted with the use of blind spot radars/lidars.

In addition to calculating hitch angle, the image from the camera 44 may be shown on a display 46. If multiple cameras 44 are used, the surround view of the vehicle 10 may also be integrated to a display 46. Additionally, objects 48 on the surround view image 46 may be highlighted to warn drivers of possible collisions. In particular, if the user is near the front of the vehicle 10, the vehicle 10 may rotate around at a faster than expected rate and objects 48 that at first appear to be far enough away may quickly become a potential collision.

The surround view function presents the driver with a dynamic set of synthetic viewpoints that provide an unobstructed view of the ground both in the immediate vicinity of the vehicle 10 as well as in the medium distance. The viewpoints are completely configurable and useful for parking and reversing maneuvers. In one embodiment, an extended surround view capability may be provided by using another camera 44 connected at the rear of the trailer 11 to increase visibility.

With the trailer backing system 14 of the present invention, one user may back the trailer into a desired final position in a manner that is intuitive to use and does not require assistance from other people (a spotter is not required).

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a backing system for a vehicle and trailer assembly, the method comprising:
  recording an image of a hitch for the vehicle and trailer assembly with a camera coupled to the vehicle;

learning with an electronic control unit a plurality of geometry distances related to a geometry of the vehicle and a geometry of the trailer, the geometry distances include a vehicle wheelbase, a distance from a rear axle of the vehicle to a hitch point on the vehicle, a length of the trailer, a distance of the hitch point to a first axle on trailer, and a height from the ground to the hitch point;

identifying a plurality of reference points on the trailer, the reference points including corners of the trailer, hitch attachment point, and body decals on the trailer, the reference points are vertically and/or horizontally spaced from one another, the reference points are provided by a manufacturer of the vehicle;

learning with the electronic control unit a plurality of relative distances between two or more of the plurality of reference points; and determining a current hitch angle between the vehicle and the trailer based on the plurality of relative distances and the plurality of geometry distances.

2. The method of claim 1, wherein the camera is a rear facing back-up camera.

3. The method of claim 1, wherein learning the plurality of geometry distances further comprises inputting the distances to the electronic control unit by a user through a user input.

4. The method of claim 1, wherein learning the plurality of geometry distances further comprises:
  initiating a learning mode for the electronic control unit of the backing system;
  moving the vehicle and trailer assembly in at least one of a forward and backward direction while in the learning mode;
  recording with the electronic control unit hitch adjustment values occurring during the movement of the vehicle and trailer assembly; and
  calculating from the hitch adjustment values a plurality of vehicle and trailer geometry distances.

5. The method of claim 1, wherein the vehicle and trailer assembly move in real time with inputs received by the electronic control unit.

6. The method of claim 1, wherein the current hitch angle is calculated in real time with the inputs received by the electronic control unit.

7. The method of claim 1, wherein the electronic control unit is in communication with a control device, the control device includes a display screen configured to be a human machine interface capable of receiving input requests from a user.

8. The method of claim 1, further comprising the electronic control unit recording respective distances between the plurality of spaced apart reference points on the trailer at known hitch angles and compared the relative distances to current distances measured by the electronic control unit in the image.

9. A backing system for a vehicle and trailer assembly comprising, the backing system comprising:
  a control device; and
  an electronic control unit in communication with the control device to receive at least one input from the control device, wherein the electronic control unit includes instructions for:
    initiating a backing system mode for the backing system when a start system input is received from a control device;
    recording an image of a hitch for the vehicle and trailer assembly with a camera mounted to the vehicle;
    learning with the electronic control unit a plurality of geometry distances related to geometry of the vehicle and a geometry of the trailer, the geometry distances include a vehicle wheelbase, a distance from a rear axle of the vehicle to a hitch point on the vehicle, a length of the trailer, a distance of the hitch point to a first axle on trailer, and a height from the ground to the hitch point;
    identifying a plurality of reference points on the trailer, the reference points including corners of the trailer, hitch attachment point, and body decals on the trailer, the reference points are vertically and/or horizontally spaced from one another, the reference points are provided by a manufacturer of the vehicle;
    learning with the electronic control unit a plurality of relative distances between two or more of the plurality of reference points; and
    determining a current hitch angle between the vehicle and the trailer based on the plurality of relative distances and the plurality of geometry distances.

10. The backing system of claim 9, wherein the camera is a rear facing back-up camera.

11. The backing system of claim 9, wherein learning the plurality of geometry distances further comprises inputting the distances to the electronic control unit by a user through a user input.

12. The backing system of claim 9, wherein the electronic control unit is further configured with instructions for:
  initiating a learning mode for the electronic control unit of the backing system;
  moving the vehicle and trailer assembly in at least one of a forward and backward direction while in the learning mode;
  recording with the electronic control unit hitch adjustment values occurring during the movement of the vehicle and trailer assembly; and
  calculating from the hitch adjustment values a plurality of vehicle and trailer geometry distances.

13. The backing system of claim 9, wherein the vehicle and trailer assembly move in real time with inputs received by the electronic control unit.

14. The backing system of claim 9, wherein the current hitch angle is calculated in real time with the inputs received by the electronic control unit.

15. The system of claim 9, wherein the control device has a display screen configured to be a human machine interface capable of receiving input requests from a user.

16. The system of claim 9, wherein the electronic control unit is further configured with instructions for recording respective distances between the plurality of spaced apart reference points on the trailer at known hitch angles and compared the relative distances to current distances measured by the electronic control unit in the image.

* * * * *